(12) United States Patent
Wang et al.

(10) Patent No.: US 11,694,062 B2
(45) Date of Patent: Jul. 4, 2023

(54) RECURRENT NEURAL NETWORKS HAVING A PROBABILISTIC STATE COMPONENT AND STATE MACHINES EXTRACTED FROM THE RECURRENT NEURAL NETWORKS

(71) Applicant: NEC Laboratories Europe GmbH, Heidelberg (DE)

(72) Inventors: Cheng Wang, Heidelberg (DE); Mathias Niepert, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 973 days.

(21) Appl. No.: 16/524,224

(22) Filed: Jul. 29, 2019

(65) Prior Publication Data

US 2020/0104671 A1    Apr. 2, 2020

Related U.S. Application Data

(60) Provisional application No. 62/737,206, filed on Sep. 27, 2018.

(51) Int. Cl.
*G06N 3/044* (2023.01)
*G06N 3/08* (2023.01)
*G06N 3/047* (2023.01)

(52) U.S. Cl.
CPC ............ *G06N 3/044* (2023.01); *G06N 3/047* (2023.01); *G06N 3/08* (2013.01)

(58) Field of Classification Search
CPC ....... G06N 3/08; G06N 3/0472; G06N 3/0445
See application file for complete search history.

(56) References Cited

U.S. PATENT DOCUMENTS

| 5,943,659 | A | * | 8/1999 | Giles | G06N 3/0436 706/2 |
|---|---|---|---|---|---|
| 10,049,106 | B2 | | 8/2018 | Goyal et al. | |
| 2007/0162272 | A1 | | 7/2007 | Koshinaka | |
| 2017/0199665 | A1 | | 7/2017 | Zhai et al. | |
| 2017/0358293 | A1 | * | 12/2017 | Chua | G10L 15/16 |
| 2018/0204566 | A1 | | 7/2018 | Kanda | |
| 2018/0253866 | A1 | | 9/2018 | Jain et al. | |
| 2018/0329883 | A1 | * | 11/2018 | Leidner | G06F 40/58 |

OTHER PUBLICATIONS

Jacobsson (Rule Extraction from Recurrent Neural Networks, Jun. 2006, pp. 0-212) (Year: 2006).*
Wang et al. (An Empirical Evaluation of Rule Extraction from Recurrent Neural Networks, Nov. 2017, pp. 1-18) (Year: 2017).*
Jacobsson (Rule Extraction from Recurrent Neural Networks: A Taxonomy and Review, 2004, pp. 0-51) (Year: 2004).*

(Continued)

*Primary Examiner* — George Giroux
(74) *Attorney, Agent, or Firm* — Leydig, Voit & Mayer, Ltd.

(57) ABSTRACT

A computer-implemented method includes instantiating a neural network including a recurrent cell. The recurrent cell includes a probabilistic state component. The method further includes training the neural network with a sequence of data. In an embodiment, the method includes extracting a deterministic finite automaton from the trained recurrent neural network and classifying a sequence with the extracted automaton.

15 Claims, 7 Drawing Sheets

(56) References Cited

OTHER PUBLICATIONS

Giles et al. (Noisy Time Series Prediction using Recurrent Neural Networks and Grammatical Inference, 2001, pp. 161-183) (Year: 2001).*

Omlin et al. (Fuzzy Finite-State Automata Can Be Deterministically Encoded into Recurrent Neural Networks, Feb. 1998, pp. 76-89) (Year: 1998).*

Omlin et al. (Extraction of Rules from Discrete-time Recurrent Neural Networks, Jun. 1995, pp. 41-52) (Year: 1995).*

Cuong Tuan Nguyen, et al., "Finite State Machine Based Decoding of Handwritten Text Using Recurrent Neural Networks", 2016 15th International Conference on Frontiers in Handwriting Recognition, Dec. 2016, pp. 246-251.

Yo Joong Choe, et al., "Probabilistic Interpretations of Recurrent Neural Networks", Final Report, 10-708 Probabilistic Graphical Models, 2017, Dec. 2017, pp. 1-9.

Adji B. Dieng, et al., "Noisin: Unbiased Regularization for Recurrent Neural Networks", arXiv:1805.01500v2 [stat.ML], Jul. 13, 2018, pp. 1-10.

Qinglong Wang, et al., "An Empirical Evaluation of Rule Extraction from Recurrent Neural Networks", arXiv:1709.10380v5 [cs.LG], Nov. 14, 2018, pp. 1-32.

Christian W. Omlin, et al., "Constructing Deterministic Finite-State Automata in Recurrent Neural Networks", Journal of the ACM, vol. 43, No. 6, Nov. 1996, pp. 937-972.

Oluwatobi Olabiyi, et al., "Driver Action Prediction Using Deep (Bidirectional) Recurrent Neural Network", arXiv:1706.02257 [stat.ML], Jun. 7, 2017, pp. 1-7.

Steven R. Young, et al., "Recurrent Clustering for Unsupervised Feature Extractions with Application to Sequence Detection", 2012 11$^{th}$ International Conference on Machine Learning and Applications, Dec. 12.15, 2012, pp. 1-2.

Gail Weiss, et al., "Extracting Automata from Recurrent Neural Networks Using Queries and Counterexamples", arXiv:1711.09576v3 [cs.LG], Jun. 24, 2018, pp. 1-17.

Steve Lawrence, et al., "Natural Language Grammatical Inference with Recurrent Neural Networks", IEEE Transactions on Knowledge and Data Engineering, vol. 12, issue 1, January, Feb. 2000, pp. 1-26.

* cited by examiner $S \rightarrow (S) \mid SS \mid T$
$T \rightarrow a \mid b \mid ... \mid z$
FIG. 5A
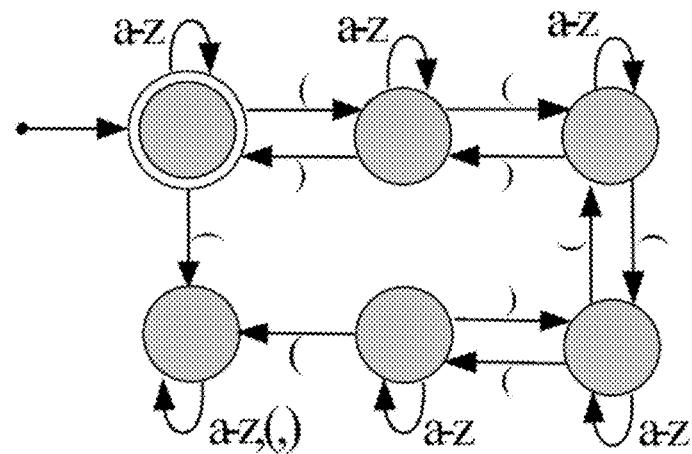
FIG. 5B
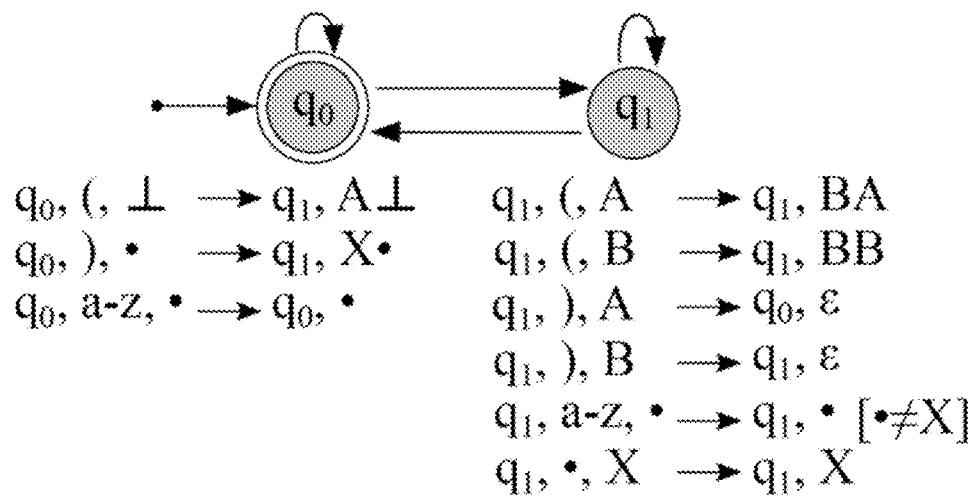
FIG. 5C

Input: pre-trained SR-RNN, dataset $D$, alphabet $\Sigma$, start token $s$
Output: transition function $\delta$ of the DFA
for $i, j \in \{1, ..., k\}$ and all $x \in \Sigma$ do
$\quad \mathcal{T}[(c_i, x, c_j)] = 0$     # initialize transition counts to zero
end
$\{p_i\}_{i=1}^k \leftarrow$ SR-RNN$(s)$     # compute the transition probabilities for the start token
$j = \arg\max_{i \in \{1,...,k\}}(p_i)$     # determine $j$ the centroid with max transition probability
$c_0 = j$     # set the start centroid $c_0$ to $j$
for $x = (x_1, x_2, ..., x_T) \in D$ do
$\quad$ for $t \in \{1, ..., T\}$ do
$\quad\quad \{p_i\}_{i=1}^k \leftarrow$ SR-RNN$(x_t)$     # compute the transition probabilities for the $t$-th token
$\quad\quad j = \arg\max_{i \in \{1,...,k\}}(p_i)$     # determine $j$ the centroid with max transition probability
$\quad\quad c_t = j$     # set $c_t$, the centroid in time step $t$, to $j$
$\quad\quad \mathcal{T}[(c_{t-1}, x_t, c_t)] \leftarrow \mathcal{T}[(c_{t-1}, x_t, c_t)] + 1$     # increment transition count
$\quad$ end
end
for $i \in \{1, ..., k\}$ and $x \in \Sigma$ do
$\quad \delta(i, x) = \arg\max_{j \in \{1,...,k\}} \mathcal{T}[(i, x, j)]$     # compute the transition function of the DFA
end
return $\delta$

FIG. 6

RECURRENT NEURAL NETWORKS HAVING A PROBABILISTIC STATE COMPONENT AND STATE MACHINES EXTRACTED FROM THE RECURRENT NEURAL NETWORKS

CROSS-REFERENCE TO RELATED APPLICATION

The present application claims priority to U.S. Provisional Patent Application No. 62/737,206, filed on Sep. 27, 2018, the entire contents of which, including any appendices, are hereby incorporated by reference.

FIELD

The present application relates to, among other things, recurrent neural networks and state machines (e.g., deterministic finite state machines). The state machines can be extracted from the recurrent neural networks.

BACKGROUND

An objective of machine learning can be to classify sequences or to transform (e.g., encode) one sequence into another. Examples of sequence data include blocks of texts (e.g., sentences) for natural language processing and network events (e.g., request traffic such as data packets) in a communication network. In natural language processing, an objective can be to classify a sentence or set of sentences as having a positive or negative sentiment towards a particular product. In the context of computer networks, an objective can be to perform particular network actions (e.g., rejecting a connection request or terminating an existing connection) based on sequences of packets encountered in a particular network node.

SUMMARY

In an embodiment, a computer-implemented method includes instantiating a neural network comprising a recurrent cell. The recurrent cell comprising a probabilistic state component. The method further includes training the neural network with a sequence of data.

BRIEF DESCRIPTION OF THE DRAWINGS

Embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5A depicts context-free grammar for a language of balanced parentheses.

FIG. 5B depicts a finite state machine for the language of balanced parentheses.

FIG. 5C depicts a deterministic pushdown automaton for the language of balanced parentheses.

FIG. 6 depicts code for a finite state machine extraction algorithm.

DETAILED DESCRIPTION

Figure 1A:
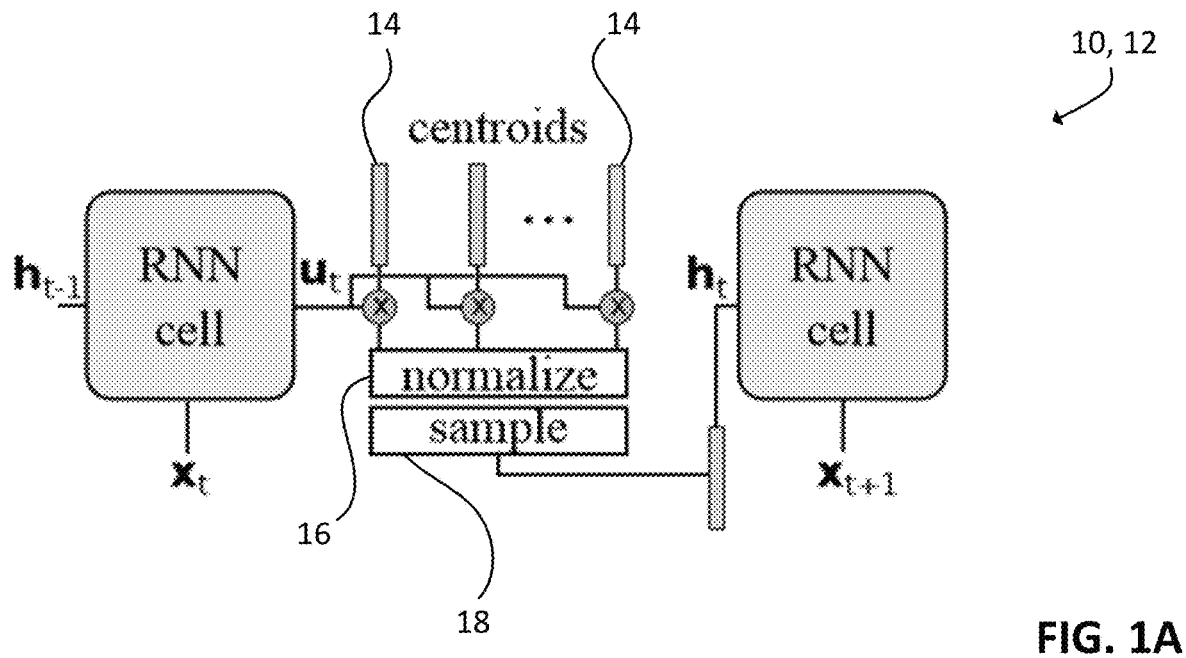
FIG. 1A is a block diagram of an exemplary cell of an exemplary recurrent neural network.

Recurrent neural networks (RNNs) have been used to address sequence learning problems. RNNs are suitable for a large class of problems including natural language processing and time series predictions. It can be difficult to inspect RNNs to understand, debug, and verify their inner workings. There have been attempts to extract deterministic finite automata (DFAs) post-hoc, that is, after the RNNs have been trained on data.

A DFA is an interpretable state machine that can be employed to understand and debug the working of a RNN. The term deterministic can indicate that a function can identify a subsequent state from a current state and input token. A RNN can implicitly move between a set of states and that these states can be clustered so as to extract the state dynamics of a finite state machine.

The present application discloses methods for training RNNs and extracting their underlying finite state machines (e.g., DFA). The methods can do so directly and not in a post-hoc manner. The present application discloses a class of RNNs configured such that a finite state machine of the actual state dynamic can be extracted efficiently and accurately. The extracted DFAs can then be inspected, debugged, and adjusted before being deployed.

Existing RNN models may be unable to extrapolate to longer input sequences. For instance, while existing RNNs can parse natural language sentences (sequences of words), these networks have difficulties analyzing longer sentences or several consecutive sentences in a document. Methods disclosed herein improve RNN models by adding a finite number of states that the model is restricted to utilize. Based on these finite states, the RNN performs probabilistic state transitions. This enables the models to extrapolate (generalize) to longer input sequences. Methods disclosed herein enable RNNs to behave as an automaton with external memory and less as an automaton without external memory.

Disclosed is a method for processing input sequences (i.e., inputs). Input sequences can be defined by a sequence of tokens from a fixed vocabulary. Examples of input sequences include linguistic sentences (where the tokens are words) and information requests (e.g., HTTP/HTTPS requests) within a communication network (e.g., communication between processing systems or communication within a single processing system).

Disclosed are state-regularized RNNs (SR-RNNs), a class of RNNs with a probabilistic state transition mechanism. Disclosed are mechanisms for adding a probabilistic transition mechanism to a RNN. Adding the transition dynamics offers advantages. First, the transition dynamics enables extraction of a deterministic automaton from the trained RNNs. As stated above, deterministic can mean that the mapping from the current state and input token to the next state is a function. These deterministic automata can be inspected and used to understand the working of the RNN. The automata can have a fully predictable behavior. It is possible to use the automata as the sequence classifier. Second, the transition dynamics enable the RNN to operate as a pushdown automaton, thereby enhancing generalization performance.

In an embodiment, a method can include one or both of the following two parts. The first part can include equipping a RNN with a probabilistic mechanism that makes the RNN transition between a finite set of discrete states. The second part can include processing input sequences such as text or network request sequences, training the SR-RNN, extracting the DFA, and deploying the deterministic automaton to perform sequence classification. As stated above, an advantage of this technique is that the DFA can be inspected and evaluated before being deployed. Moreover, the DFA can behave predictably which is important in critical infrastructure such as network firewalls, etc.

Disclosed is a computer-implemented method comprising: instantiating a neural network comprising a recurrent cell, the recurrent cell comprising a probabilistic state component; and training the neural network with a sequence of data.

In an embodiment, the method comprises extracting a deterministic finite automaton from the trained recurrent neural network. In an embodiment, the method comprises classifying a sequence with the extracted automaton. In an embodiment, the probabilistic state component comprises at least two discrete vectors. In an embodiment, the probabilistic state component comprises a finite quantity of predetermined vectors and the recurrent cell is configured to express a hidden state of the recurrent cell as a function of the predetermined vectors.

In an embodiment, the hidden state of the recurrent cell is a second hidden state and the recurrent cell is configured to express the second hidden state as a weighted average of the predetermined vectors, the method further comprising: computing the weighted average to minimize a disparity between the second hidden state and a first hidden state of the recurrent cell. In an embodiment, the neural network comprises a plurality of the recurrent cells, each of the recurrent cells comprising the probabilistic state component. In an embodiment, each of the recurrent cells comprises a respective unique set of the predetermined vectors, each of the respective sets being constant over at least multiple consecutive time steps.

In an embodiment, training the neural network comprises adjusting each of the predetermined vector sets to minimize a loss function after the multiple consecutive time steps. In an embodiment, the probabilistic state component comprises a plurality of vectors and the recurrent cell is configured to express a hidden state at time step T as a function of at least two of the plurality of vectors based on (i) a hidden state of the recurrent cell at time step T−1 and (ii) a dynamic input for time step T. In an embodiment, the recurrent cell is configured to express a hidden state at time step T+1 as a function of at least two of the plurality of vectors based on (i) a hidden state of the recurrent cell at time step T and (ii) a dynamic input for time step T+1.

Disclosed is a processing system comprising one or more processors configured to: instantiate a neural network comprising a recurrent cell, the recurrent cell comprising a probabilistic state component; and train the neural network with a sequence of data.

In an embodiment, the one or more processors are configured to: extract a deterministic finite automaton from the trained recurrent neural network; and classify a sequence with the extracted automaton.

Disclosed is non-transitory computer-readable medium comprising code for causing one or more processors of a processing system to: instantiate a neural network comprising a recurrent cell, the recurrent cell comprising a probabilistic state component; and train the neural network with a sequence of data.

In an embodiment, the medium comprises code for causing the one or more processors to: extract a deterministic finite automaton from the trained recurrent neural network; and classify a sequence with the extracted automaton.

As further discussed below, a processing system can be configured to perform any methods disclosed herein. Therefore, when the present application discloses a method (e.g., one or more functions or operations), the present application simultaneously discloses a processing system configured to perform the method.

Figure 1B:
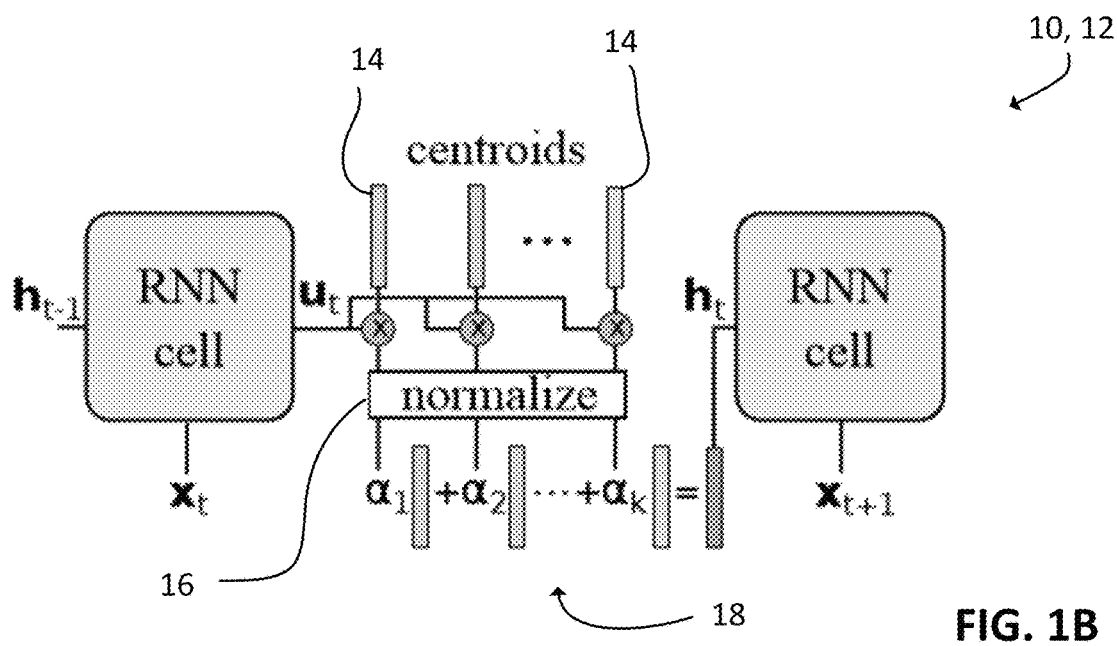
FIG. 1B is a block diagram of an exemplary cell of an exemplary recurrent neural network.

Referring to FIG. 1A and FIG. 1B, a SR-RNN 10 can include a recurrent cell 12. Recurrent cell 12 can compute a hidden state $h_t$ for time t based on the hidden state $h_{t-1}$ at time t−1 and the current input $x_t$. Although FIGS. 1A and 1B each only show a single recurrent cell 12 unrolled over two time steps, the SR-RNN 10 can include a plurality of recurrent cells 12.

Each recurrent cell 12 within SR-RNN 10 can maintain a quantity k of learnable vectors $s_1, \ldots, s_k$ 14 which can be called centroids, intervals, scalars, blocks, states, or probabilistic state components. Besides recurrent cells 12, SR-RNN 10 can include other deep learning nodes (e.g., feed forward neurons of a convolutional layer). In an embodiment, each recurrent cell 12 can function as a layer of a neural network. As used herein, the term "vector" can include a multi-dimensional matrix.

During each step of the state-regularized RNN (SR-RNN) and as shown in FIGS. 1A and 1B, a learnable function 16 can be applied to map the current state and the centroids into a probability distribution (e.g., weighted average) over the centroids. For instance, if the RNN cell has five centroids, then the learnable function can accept, as an input, the last hidden state $h_{t-1}$ of the SR-RNN and the five centroids. The learnable function 16 can output a probability distribution over the five centroids such as $p=[p_1, \ldots, p_k]=[0.1, 0.2, 0.5, 0.1, 0.1]$. The probabilities can be used to compute a new hidden state $h_t$ of the RNN through a mapping function G (element number 18 in FIGS. 1A and 1B) such that $h_t = G(s_1, \ldots, s_k, p_1, \ldots, p_k)$.

One embodiment of the mapping function G (FIG. 1B) is a weighted sum of the centroids where the weights are the probabilities $p_1, \ldots, p_k$: $h_t = G(s_1, \ldots, s_k, p_1, \ldots, p_k) = p_1 * s_1 + \ldots + p_k * s_k$. Another embodiment of the mapping function G (FIG. 1A) samples a single centroid from the probability distribution $p_1, \ldots, p_k$. If, for example, $p_1 = 0.1$ and $p_2 = 0.35$, then function G would have a 10% chance of sampling centroid $s_1$ from the distribution and a 35% chance of sampling centroid $s_2$ from the distribution. According to this embodiment, the hidden state $h_t$ can be equal to the sampled centroid.

In an embodiment, the learnable function 16 can be configured to create the probability distribution $p=[p_1, \ldots, p_k]$ in order to minimize a difference (i.e., disparity) (and in the case of cell 12 in FIG. 1A, the average difference) between the output of function G ($h_t$ in FIGS. 1A and 1B) and the input into the learnable function (the input is $u_t$ in FIGS. 1A and 1B) given the existing values of learnable vectors $s_1, \ldots, s_k$ 14. For example, if $u_t = [1, 1]$, $s_1 = [2, 0]$, $s_2 = [0, 2]$, then the learnable function can compute $p_1 = 0.5$ and $p_2=0.5$, such that $h_t=0.5[2, 0]+0.5[0, 2]=[1, 1]=u_t$. The input into the learnable function $u_t$ can be called a first, intermediate, or non-regularized hidden state for time step t while the output from mapping function G ($h_t$) can be called a second, ultimate, final, or regularized hidden state for the same time step t. As previously discussed, the final hidden state $h_t$ can be expressed in terms of the learnable vectors (e.g., $1.5 \, s_1+0.6 \, s_2*1/pi*s_3$).

Figure 2:
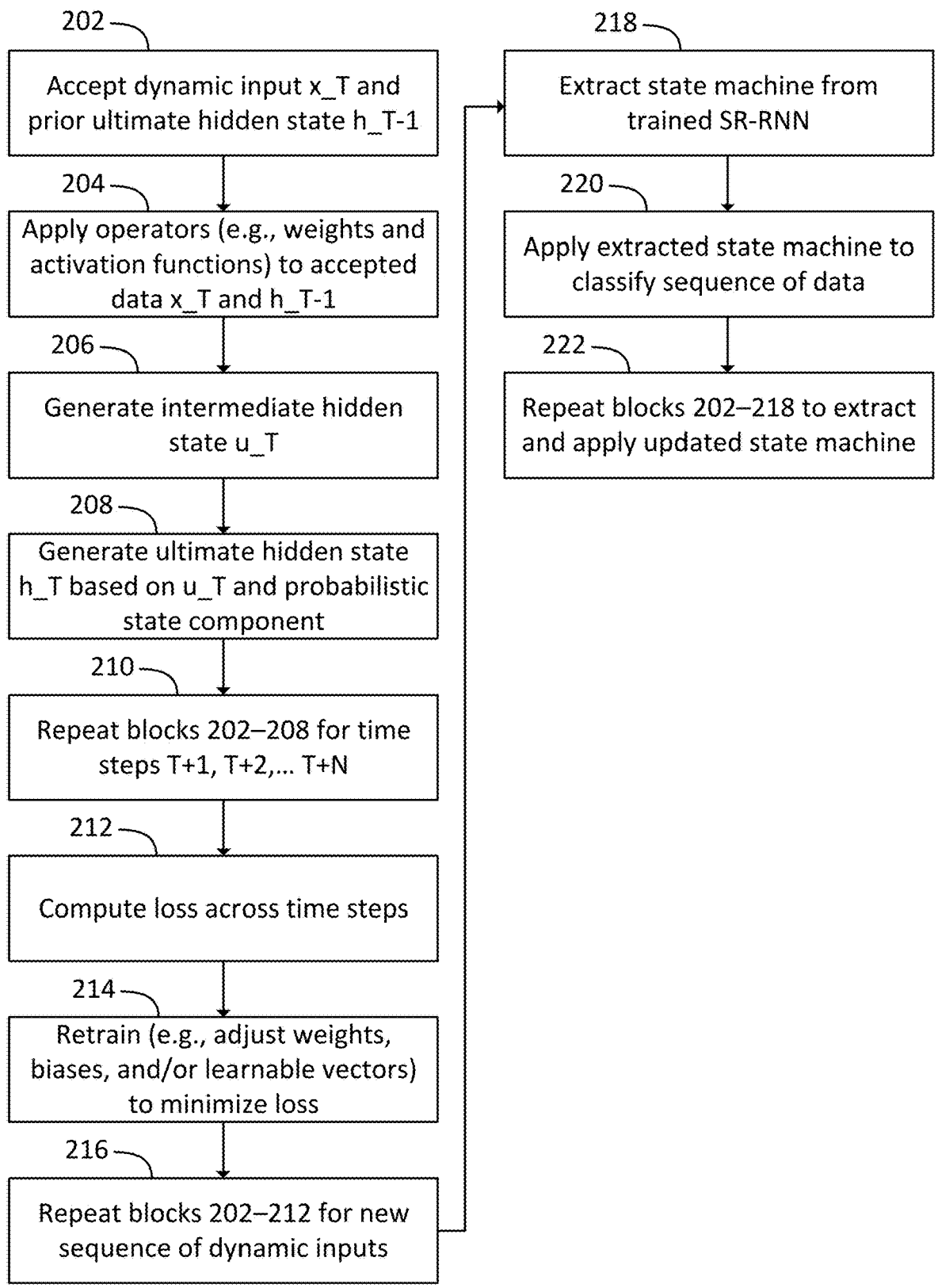
FIG. 2 is a block diagram of an exemplary computer-implemented method. The method can include training a recurrent neural network and extracting a finite state machine therefrom.

FIG. 2 depicts a machine learning method. The method can include training a neural network (e.g., a SR-RNN) implemented (e.g., virtually through script) on a processing system. The neural network can include one or more recurrent cells (e.g., recurrent cell 12 of FIGS. 1A and/or 1B). Each recurrent cell can include a probabilistic state component (e.g., learnable vectors $s_1, \ldots, s_k$ 14 of FIGS. 1A and 1B). Each state component can be identical.

At block 202, the processing system can cause the recurrent cell can accept a dynamic input for time step T ($x_T$) and an ultimate (e.g., regularized) output of the recurrent cell during for time step T−1 ($h_{T-1}$). Each of the inputs can be vectors including multiple dimensions. For example, the dynamic input $x_T$ can be an ordered series of outputs of a feed-forward layer of the SR-RNN (e.g., a convolutional layer, a pooling layer, a fully connected layer, etc.).

In an embodiment, the dynamic input x at each time step is a vector encoding a different word of a block of text. For example, given the block of text "the blue dog", the dynamic input $x_T$ can encode article "the", the dynamic input $x_{T+1}$ can encode adjective "blue", and the dynamic input $x_{T+2}$ can encode noun "dog". In another embodiment, the dynamic input x at each time step is a vector encoding a different network event from a series of network events.

At block 204, the processing system can cause the recurrent cell to apply a set of mathematical operators to the inputs including weights and activation functions. For example, the recurrent cell can store a unique and predetermined weight parameter for each value of the dynamic input $x_T$ and a unique and predetermined weight parameter for each value of the prior ultimate output $h_{T-1}$. Each activation function can include a trainable bias. The activation functions can operate on the weighted inputs. In an embodiment, the recurrent cell is a long short-term memory (LSTM) unit.

At block 206, the processing system can cause the recurrent cell to generate an intermediate (e.g., non-regularized) hidden state $u_T$. The intermediate hidden state can be a vector with parameters computed as a direct result of the mathematical operators applied to the inputs. The recurrent cell can be configured such that the intermediate hidden state can assume any one of an infinite quantity of states.

At block 208, the processing system can cause the recurrent cell to apply the learnable function to the intermediate hidden state $u_T$ to generate an ultimate hidden state $h_T$. The learnable function can be configured to express (e.g., approximate or map) the hidden state $u_T$ as a function of a probabilistic state component. In an embodiment, the probabilistic state component is a plurality of predetermined vectors (e.g., learnable vectors $s_1, \ldots, s_k$ 14 of FIGS. 1A and 1B). As previously discussed, in the embodiment of FIG. 1B, the learnable function can map the hidden state $u_T$ to a weighted average (also called a probability distribution) of one or more of the learnable vectors. While in the embodiment of FIG. 1A, the learnable function can include a mapping function G for sampling the final hidden state $h_T$ from a probability distribution of one or more of the learnable vectors.

At block 210, the processing system can cause the recurrent cell to repeat blocks 202-208 for time steps T+1, T+2, ... T+N, where N is an arbitrary predetermined number. Each iteration (time step) of the recurrent cell can apply the same set of weights and the same probabilistic state component (e.g., the same set of learnable vectors).

At block 212, the processing system can compute a loss for the recurrent cell. The loss can be an aggregate of individual losses occurring during each of the time steps. At block 214, the processing system can retrain the recurrent cell to minimize the loss (e.g., the aggregate loss across the time steps). Retraining can include adjusting the weights, the biases, and the learnable vectors to minimize loss. Retraining can be performed via a gradient descent (e.g., stochastic gradient descent) algorithm.

At block 216, the processing system can repeat blocks 202-214 for a new sequence of dynamic inputs (e.g., a new block of text). At block 218, the processing system can extract a state machine (e.g., a DFA) from the trained SR-RNN. At block 220, the processing system can apply the state machine to classify a sequence of data (e.g., a block of text or internal network traffic). At block 222, the processing system can repeat blocks 202-220 to replace the existing state machine with an updated state machine.

The SR-RNN can perform blocks 202-222 for multiple recurrent cells, each having a respective unique probabilistic state component (e.g., a unique set of learnable vectors). Each of the respective probabilistic state components, weights, and biases can remain constant during each iteration of blocks 202-210.

Figure 3:
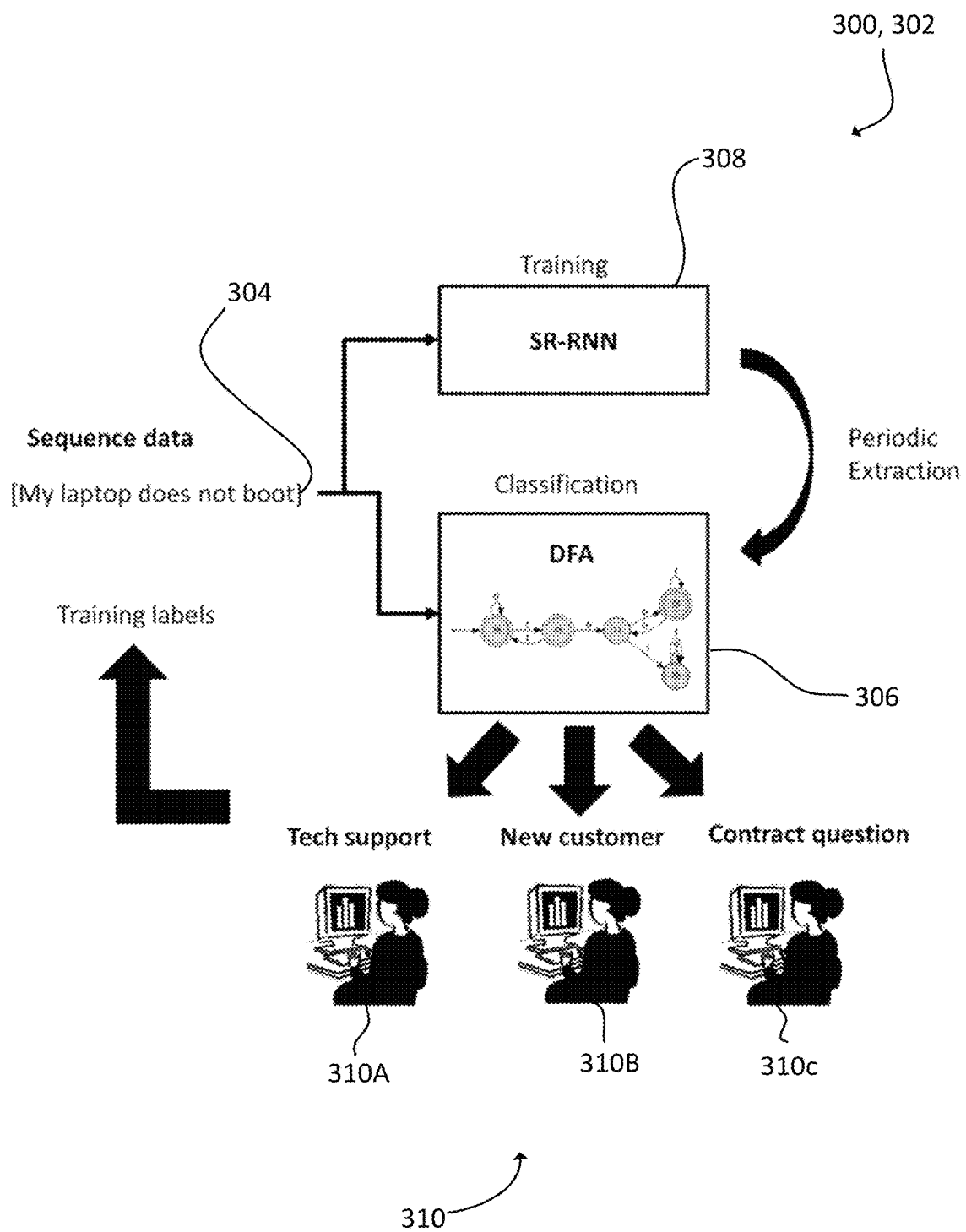
FIG. 3 is a schematic of an exemplary implementation of the method of FIG. 2.

As shown in FIG. 3, a first exemplary implementation of a SR-RNN is a text processing system 302 for an automated customer service chat assistant 300. Within the system, the user can input text into a prompt 304. The text (i.e., sequence data) can be sent to and processed by a DFA 306 previously extracted from a SR-RNN 308 to classify the text as belonging to one of several categories 310 (e.g., "tech support question" 310A, "new customer question" 310B, "contract question" 310C, etc.). The system can collect ground truth about the observed questions to continuously update the SR-RNN. Periodically, a new DFA can be extracted from the SR-RNN, compared to the deployed DFA, and reviewed for errors. If acceptable, the new DFA can then replace the deployed DFA.

A second exemplary implementation of a SR-RNN is a firewall for a computer network. Firewall policy can be operated by a DFA (i.e., a finite state machine). The implementation can process network traffic and record attempted security intrusions. Based on this information, the SR-RNN can be trained to classify traffic sequences as suspicious. Periodically, anew DFA can be extracted from the SR-RNN, compared to the deployed DFA, and reviewed for errors. If acceptable, the new DFA can then replace the deployed DFA.

The following publications, which are each hereby incorporated by reference, include information relevant to, among other things, DFAs and RNNs: [1] Gail Weiss, Yoav Goldberg, and Eran Yahav. Extracting automata from recurrent neural networks using queries and counterexamples. In Proceedings of the 35th International Conference on Machine Learning, volume 80, pp. 5247-5256, 2018b. [2] C Lee Giles, D Chen, C B Miller, H H Chen, G Z Sun, and Y C Lee. Second-order recurrent neural networks for grammatical inference. In Neural Networks, 1991., IJCNN-91-Seattle International Joint Conference on, volume 2, pp. 273-281. IEEE, 1991. [3] Qinglong Wang, Kaixuan Zhang, Alexander G. Ororbia II, Xinyu Xing, Xue Liu, and C. Lee Giles. An empirical evaluation of rule extraction from recurrent neural networks. Neural Computation, 30(9):2568-2591, 2018b.

Figure 4:
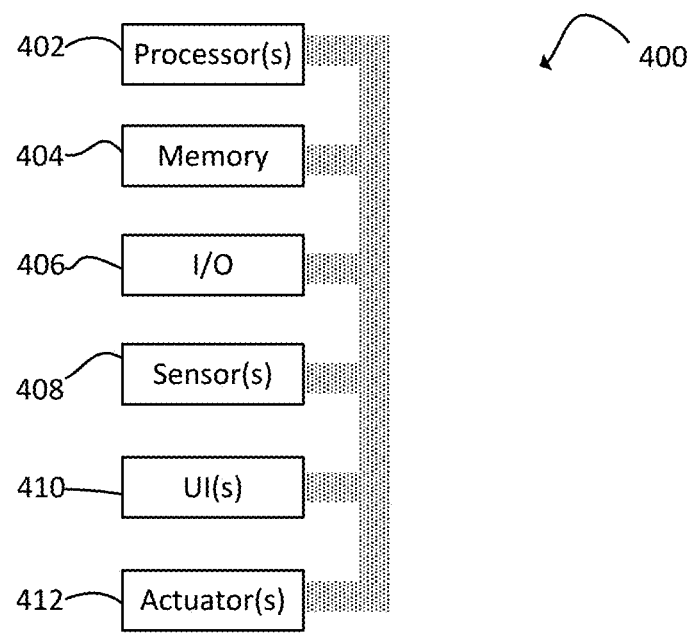
FIG. 4 is a block diagram of an exemplary processing system. The processing system can be configured to perform the method of FIG. 2.

Referring to FIG. 4, processing system 400 can include one or more processors 402, memory 404, one or more input/output devices 406, one or more sensors 408, one or more user interfaces 410, and one or more actuators 412.

Processors 402 can include one or more distinct processors, each having one or more cores. Each of the distinct processors can have the same or different structure. Processors 402 can include one or more central processing units (CPUs), one or more graphics processing units (GPUs), circuitry (e.g., application specific integrated circuits (ASICs)), digital signal processors (DSPs), and the like. Processors 402 can be mounted on a common substrate or to different substrates.

Processors 402 are configured to perform a certain function, method, or operation at least when one of the one or more of the distinct processors is capable of executing code (e.g., interpreting scripts), stored on memory 404 embodying the function, method, or operation. Processors 402, and thus processing system 400, can be configured to perform, automatically, any and all functions, methods, and operations disclosed herein.

For example, when the present disclosure states that processing system 400 performs/can perform task "X" (or that task "X" is performed), such a statement should be understood to disclose that processing system 400 can be configured to perform task "X". Processing system 400 are configured to perform a function, method, or operation at least when processors 402 are configured to do the same.

Memory 404 can include volatile memory, non-volatile memory, and any other medium capable of storing data. Each of the volatile memory, non-volatile memory, and any other type of memory can include multiple different memory devices, located at multiple distinct locations and each having a different structure. Memory 404 can include cloud storage.

Examples of memory 404 include a non-transitory computer-readable media such as RAM, ROM, flash memory, EEPROM, any kind of optical storage disk such as a DVD, a Blu-Ray® ED disc, magnetic storage, holographic storage, an HDD, an SSD, any medium that can be used to store program code in the form of instructions or data structures, and the like. Any and all of the methods, functions, and operations described in the present application can be fully embodied in the form of tangible and/or non-transitory machine-readable code (e.g., scripts) saved in memory 404.

Input-output devices 406 can include any component for trafficking data such as ports, antennas (i.e., transceivers), printed conductive paths, and the like. Input-output devices 406 can enable wired communication via USB®, DisplayPort®, HDMI®, Ethernet, and the like. Input-output devices 406 can enable electronic, optical, magnetic, and holographic, communication with suitable memory 406. Input-output devices 406 can enable wireless communication via WiFi®, Bluetooth®, cellular (e.g., LTE®, CDMA®, GSM®, WiMax®, NFC®), GPS, and the like. Input-output devices 406 can include wired and/or wireless communication pathways.

Sensors 408 can capture physical measurements of environment and report the same to processors 402. User interface 410 can include displays, physical buttons, speakers, microphones, keyboards, and the like. Actuators 412 can enable processors 402 to control mechanical forces.

Processing system 400 can be distributed. Processing system 400 can have a modular design where certain features have a plurality of the aspects shown in FIG. 4. For example, I/O modules can include volatile memory and one or more processors. Processing system 400 can instantiate (e.g., virtually instantiate) any neural networks disclosed herein.

The following disclosure provides further description of exemplary embodiments of the invention.

1. Introduction

In an embodiment, SR-RNNs are provided, which can be a class of recurrent networks that can apply a stochastic state transition mechanism between cell applications. The stochastic mechanism can model probabilistic state dynamics that lets the SR-RNN transition between a finite number of learnable states. The parameters of the stochastic mechanism can be trained jointly with the parameters of the base RNN. SR-RNNs have several advantages over existing RNNs. For example, instead of having to apply a post-hoc DFA extraction, it is possible to determine SR-RNN (probabilistic and deterministic) state transition behavior more directly.

Also provided is a method for extracting DFAs representing the state transition dynamics of the RNNs. Poor extrapolation behavior of RNNs can be caused by memorization with hidden states. RNNs—even those with cell states or external memory—tend to memorize mainly through their hidden states and in an unstructured manner.

The state-regularization mechanism of embodiments disclosed herein can shift representational power to memory components such as the cell state, resulting in improved extrapolation performance. State-regularization enables RNNs to operate less like DFAs with large state spaces and more like automata with external memory. For state-regularized LSTMs, for instance, memorization can be shifted entirely from the hidden state to the cell state. For text and visual data, state-regularization provides more intuitive interpretations of RNN behavior.

2. Relevant Information

A DFA is a state machine that accepts or rejects sequences of tokens and produces one unique computation path for each input. Let $\Sigma^*$ be the language over the alphabet $\Sigma$ and let $\epsilon$ be the empty sequence. A DFA over an alphabet (set of tokens) $\Sigma$ is a 5-tuple $(Q, \Sigma, \delta, q_0, F)$ including a finite set of states $Q$; a finite set of input tokens $\Sigma$ called the input alphabet; a transition functions $\delta: Q \times \Sigma \rightarrow Q$; a start state $q_0$; and a set of accept states $F \subseteq Q$. A sequence w is accepted by the DFA if the application of the transition function, starting with $q_0$, leads to an accepting state. FIG. 5B depicts a DFA for the language of balanced parentheses (BP) up to depth 4. A language is regular if and only if it is accepted by a DFA. FIG. 5A depicts context-free grammar for the language of balanced parentheses (BP).

A pushdown automata (PDA) is a 7-tuple $(Q, \Sigma, \Gamma, \delta, q_0, \bot, F)$ including a finite set of states $Q$; a finite set of input tokens $\Sigma$ called the input alphabet; a finite set of tokens F called the stack alphabet; a transition function $\delta \subseteq Q \times (\Sigma \cup \epsilon) \times \Gamma \rightarrow Q \times \Gamma^*$; a start state $q_0$; the initial stack symbol $\bot$; and a set of accepting states $F \subseteq Q$. Computations of the PDA are applications of the transition relations. The computation starts in $q_0$ with the initial stack symbol $\equiv$ on the stack and sequence w as input. The pushdown automaton accepts w if after reading w the automaton reaches an accepting state. FIG. 5C depicts a deterministic PDA for the language BP.

3. State-Regularized Recurrent Neural Networks

A standard recurrence of a RNN is $h_t = f(h_{t-1}, c_{t-1}, x_t)$ where $h_t$ is the hidden state vector at time t, $c_t$ is the cell state at time t, and $x_t$ is the input symbol at time t. RNNs having unrolled cells that are only connected through the hidden output states h and no additional vectors such as the cell state are referred to as memory-less RNNs.

A cell of a state-regularized RNN (SR-RNN) can include two components. The first component, which is the recurrent component, applies the function of a standard RNN cell $u_t=f(h_{t-1}, c_{t-1}, x_t)$. For the sake of completeness, the cell state c is included here, which is absent in memory-less RNNs. A second component can be a stochastic component. In an embodiment, the stochastic component is responsible for modeling the probabilistic state transitions mechanism that lets the RNN transition implicitly between a finite number of states. Let d be the size of the hidden state vectors of the recurrent cells. Moreover, let $\Delta^D:=\{\lambda\Sigma\mathbb{R}_+^D:\|\lambda\|=1\}$ be the (D−1) probability simplex. The stochastic component maintains k learnable centroids $s_1, \ldots, s_k$ of size d which we often write as the column vectors of a matrix $S\in\mathbb{R}^{d\times k}$. The weights of these centroids are global parameters shared among all cells. The stochastic component computes, at each time step t, a discrete probability distribution from the output $u_t$ of the recurrent component and the centroids of the stochastic component.

$$\alpha=g(S,ut) \text{ with } \alpha\in\Delta k. \qquad \text{Equation 1}$$

Instances of g ("g" is also referred to as "G" in the description above) can be differentiable to facilitate end-to-end training. Typical instances of the function g are based on the dot-product or the Euclidean distance, normalized into a probability distribution.

$$\alpha_i = \frac{\exp((u_t \cdot s_i)/\tau)}{\sum_{i=1}^{k}\exp((u_t \cdot s_i)/\tau)}. \qquad \text{Equation 2}$$

$$\alpha_i = \frac{\exp(-\|u_t - s_i\|/\tau)}{\sum_{i=1}^{k}\exp(-\|u_t - s_i\|/\tau)}. \qquad \text{Equation 3}$$

Here, $\tau$ is a temperature parameter that can be used to anneal the probabilistic state transition behavior. The lower $\tau$ the more a resembles the one-hot encoding of a centroid. The higher $\tau$ the more uniform is $\alpha$. Instead of attending to the hidden states, however, SR-RNNs can attend to the k centroids to compute transition probabilities. Each $\alpha_i$ is the probability of the RNN to transition to centroid (state) i given the vector $u_t$ for which we write $p_{u_t}(i)=\alpha_i$.

The state transition dynamics of an SR-RNN can be that of a probabilistic finite state machine. At each time step, when being in state $h_{t-1}$ and reading input symbol $x_t$, the probability for transitioning to state $s_i$ is $\alpha_i$. Hence, in its second phase the stochastic component computes the hidden state $h_t$ at time step t from the distribution a and the matrix S with a (possibly stochastic) mapping h: $\Delta^k\times\mathbb{R}^{d\times k}\to\mathbb{R}^d$. Hence, $h_t=h(\alpha, S)$. A simple instance of the mapping h is:

$$\text{sample } j\sim p_{u_t} \text{ and set } h_t=s_j. \qquad \text{Equation 4}$$

In an embodiment, this renders the SR-RNN not end-to-end differentiable, however, and one has to use EM or reinforcement learning strategies which are often less stable and less efficient. A possible alternative is to set the hidden state $h_t$ to be the probabilistic mixture of the centroids.

$$h_t = \sum_{i=1}^{k}\alpha_i s_i. \qquad \text{Equation 5}$$

In an embodiment, every internal state h of the SR-RNN, therefore, can be computed as a weighted sum $h=\alpha_1 s_1+ \ldots +\alpha_k s_k$ of the centroids $s_1, \ldots, s_k$ with $\alpha\in\Delta^k$. Here, h is a smoothed variant of the function that computes a hard assignment to one of the centroids. One can show that for $\tau\to 0$ the state dynamics based on equations (4) and (5) are identical and correspond to those of a DFA. FIGS. 1A and 1B depict two variants of the SR-RNNs.

Additional instances of h are possible. For instance, one could, for every input sequence and the given current parameters of the SR-RNN, decode the most probable state sequence and then backpropagate based on a structured loss. Since decoding is possible with Viterbi type algorithms, one could apply recent approaches to differentiable dynamic programming. The probabilistic state transitions of SR-RNNs open up new possibilities for applying more complex differentiable decoding functions. The probabilistic state transition mechanism is also applicable when RNNs have more than one hidden layer. In RNNs with l>1 hidden layers, every such layer can maintain its own centroids and stochastic component. In this case, a global state of the SR-RNN is an l-tuple, with the lth argument of the tuple corresponding to the centroids of the lth layer.

Even though a RNN is augmented with additional learnable parameter vectors, the SR-RNN can be constrained to output hidden state vectors that are similar to the centroids. For lower temperatures and smaller values for k, the ability of the SR-RNN to memorize with its hidden states can be increasingly impoverished. This behavior can be beneficial for three reasons. First, it makes the extraction of interpretable DFAs from memory-less SR-RNNs straight-forward. Instead of applying post-training DFA extraction as in previous work, the true underlying DFA is extracted directly from the SR-RNN. Second, overfitting in the context of RNNs can be often caused by memorization via hidden states. Regularizing the state space pushes representational power to memory components such as the cell state of an LSTM, resulting in improved extrapolation behavior. Third, the hidden states of RNNs tend to drift off for long input sequences. The proposed state regularization stabilizes the hidden states for longer sequences.

Below it is shown that the addition of the stochastic component, when capturing the complete information flow between cells as, for instance, in the case of GRUs, is identical to that of a probabilistic finite state machine.

Theorem 3.1: The state dynamics of a memory-less SR-RNN using equation 4 is that of a probabilistic deterministic finite automaton.

We can show that the lower the temperature the more memory-less RNNs operate like DFAs.

Theorem 3.2: For $\tau\to 0$ the state dynamics of a memory-less SR-RNN (using either equations 4 or 5) is equivalent to that of a deterministic finite automaton.

3.1 Learning DFAs with SR-RNNs

Extracting DFAs from RNNs can be motivated by applications where a thorough understanding of learned neural models is required before deployment. SR-RNNs can maintain a set of learnable states and compute and explicitly follow state transition probabilities. It is possible, therefore, to extract finite-state transition functions that truly model the underlying state dynamics of the SR-RNN. The centroids do not have to be extracted from a clustering of a number of observed hidden states but can be read off of the trained model. This renders the extraction also more efficient. Previous work can be modified to construct the transition function of a SR-RNN. See Schellhammer et al., "Knowledge extraction and recurrent neural networks: An analysis of an elman network trained on a natural language learning class", In Proceedings of the Joint Conferences on New Methods in Language Processing and Computational Natural Language Learning, pp. 73-78, 1998. See further Qinglong Wang, Kaixuan Zhang, Alexander G. Ororbia II, Xinyu Xing, Xue Liu, and C. Lee Giles, "An empirical evaluation of rule extraction from recurrent neural networks," Neural Computation, 30(9):2568-2591, 2018b. Both of these documents are hereby incorporated by reference.

Beginning with the start token of an input sequence, the transition probabilities a is computed, and the SR-RNN is moved to the highest probability state. This process is continued until the last input token is seen. By doing this, a count of transitions is obtained from every state si and input token $\alpha \in \Sigma$ to the following states (including selfloops). After obtaining the transition counts, only the most frequent transitions are kept and all other transitions are discarded. Exemplary code for the extraction algorithm appears in FIG. 6.

Figure 7:
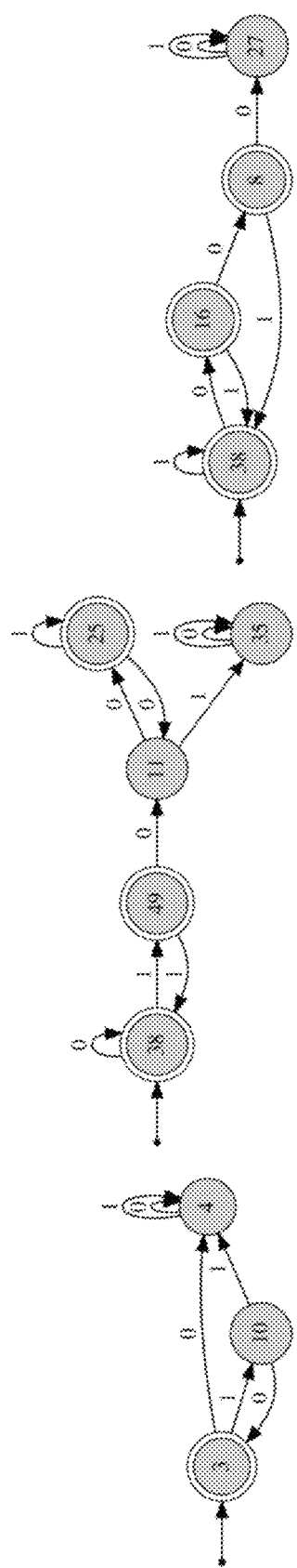
FIG. 7 shows finite state machines corresponding to Tomita grammars 2-4.

As a corollary of Theorem 3.2 it is provided that, for $\tau \to 0$, the extracted transition function is identical to the transition function of the DFA learned by the SR-RNN. For a wide range of temperatures (including the standard softmax temperature $\tau=1$) the transition behavior of a SR-GRU is identical to that of a DFA, a behavior that is common when SR-RNNs are trained on regular languages. FIG. 7 shows DFAs corresponding to the Tomita grammars 2-4. The numbers on the states correspond directly to the centroid numbers of the learned SR-GRU.

3.2 Learning Nonregular Languages with State-Regularized LSTMs

For more complex languages such as context-free languages, RNNs that behave like DFAs can generalize poorly to longer sequences. RNNs can be encouraged with memory to behave more like DPDAs and less like DFAs. The transition function $\delta$ of a DPDA takes (a) the current state, (b) the current top stack symbol, and (c) the current input symbol and maps these inputs to (1) a new state and (2) a replacement of the top stack symbol (see section 2). Hence, to allow an SR-RNN such as the SR-LSTM to operate in a manner similar to a DPDA the RNNs are given access to these three inputs when deciding what to forget from and what to add to memory. The following additions to the functions defining the forget, input, and output gates include the cell state into the LSTM's memory update decisions:

forget gate: $f_t = \sigma(W^f x_t + R^f h_{t-1} + p^f \odot c_{t-1} + b^f)$. Equation 6.

input gate: $i_t = \sigma(W^i x_t + R^i h_{t-1} + p^i \odot c_{t-1} + b^i)$. Equation 7.

output gate: $o_t = \sigma(W^o x_t + R^o h_{t-1} + p^o \odot c_t + b^o)$. Equation 8.

Here, $h_{t-1}$ is the output of the previous cell's stochastic component; Ws and Rs are the matrices of the original LSTM; the ps are the parameters of the peephole connections; and $\odot$ is the elementwise multiplication. We show empirically that the resulting SR-LSTM-P operates like a DPDA, incorporating the current cell state when making decisions about changes to the next cell state.

3.3 Additional Considerations

Implementing SR-RNNs can include extending existing RNN cells with a stochastic component. The use of start and end tokens can be beneficial. The start token is used to transition the SR-RNN to a centroid representing the start state which then does not have to be fixed a-priori. The end token is used to perform one more cell application but without applying the stochastic component before a classification layer. The end token lets the SR-RNN consider both the cell state and the hidden state to make the accept/reject decision. A temperature of $\tau=1$ (standard softmax) and an initialization of the centroids with values sampled uniformly from [−0.5, 0.5] work well across different datasets.

State regularization provides new ways to interpret the working of recurrent networks. Since SR-RNNs can have a finite set of states, the observed transition probabilities can be used to visualize their behavior. For instance, to generate prototypes for the SR-RNNs, for each state i, the input tokens can be selected that have the highest average probability leading to state i.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

We claim:

1. A computer-implemented method comprising:
    instantiating a neural network comprising a recurrent cell, the recurrent cell comprising a probabilistic state component;
    training the neural network with a sequence of data to generate a trained recurrent neural network; and
    extracting a deterministic finite automaton from the trained recurrent neural network,
    wherein the extracting of the deterministic finite automaton from the trained recurrent neural network comprises directly reading centroids of the trained recurrent neural network without learning from a clustering of a number of observed hidden states of the trained recurrent neural network.

2. The method of claim 1, further comprising: classifying a sequence with the extracted automaton.

3. The method of claim 1, wherein the probabilistic state component comprises at least two discrete vectors.

4. The method of claim 3, wherein the probabilistic state component comprises a finite quantity of predetermined vectors and the recurrent cell is configured to express a hidden state of the recurrent cell as a function of the predetermined vectors.

5. The method of claim 4, wherein the hidden state of the recurrent cell is a second hidden state and the recurrent cell is configured to express the second hidden state as a weighted average of the predetermined vectors, the method further comprising: computing the weighted average to minimize a disparity between the second hidden state and a first hidden state of the recurrent cell.

6. The method of claim 4, wherein the neural network comprises a plurality of recurrent cells, the recurrent cells comprising the recurrent cell, and each of the recurrent cells comprising the probabilistic state component.

7. The method of claim 6, wherein each of the recurrent cells comprises a respective unique set of the predetermined vectors, each of the respective sets being constant over at least multiple consecutive time steps.

8. The method of claim 7, wherein training the neural network comprises adjusting each of the predetermined vector sets to minimize a loss function after the multiple consecutive time steps.

9. The method of claim 1, wherein the probabilistic state component comprises a plurality of vectors and the recurrent cell is configured to express a hidden state at time step T as a function of at least two of the plurality of vectors based on (i) a hidden state of the recurrent cell at time step T−1 and (ii) a dynamic input for time step T.

10. The method of claim 9, wherein the recurrent cell is configured to express a hidden state at time step T+1 as a function of at least two of the plurality of vectors based on (i) a hidden state of the recurrent cell at time step T and (ii) a dynamic input for time step T+1.

11. The method of claim 1, wherein the probabilistic state component is configured to constrain the neural network such that it only transitions between a finite set of discrete states.

12. A processing system comprising one or more processors configured to:
 instantiate a neural network comprising a recurrent cell, the recurrent cell comprising a probabilistic state component;
 train the neural network with a sequence of data to generate a trained recurrent neural network; and
 extract a deterministic finite automaton from the trained recurrent neural network,
 wherein the extracting of the deterministic finite automaton from the trained recurrent neural network comprises directly reading centroids of the trained recurrent neural network without learning from a clustering of a number of observed hidden states of the trained recurrent neural network.

13. The processing system of claim 12, wherein the one or more processors are configured to:
 classify a sequence with the extracted automaton.

14. A non-transitory computer-readable medium comprising code for causing one or more processors of a processing system to:
 instantiate a neural network comprising a recurrent cell, the recurrent cell comprising a probabilistic state component;
 train the neural network with a sequence of data to generate a trained recurrent neural network; and
 extract a deterministic finite automaton from the trained recurrent neural network,
 wherein the extracting of the deterministic finite automaton from the trained recurrent neural network comprises directly reading centroids of the trained recurrent neural network without learning from a clustering of a number of observed hidden states of the trained recurrent neural network.

15. The non-transitory computer-readable medium of claim 14, further comprising code for causing the one or more processors to:
 classify a sequence with the extracted automaton.

* * * * *